United States Patent [19]
Ferriere

[11] Patent Number: 5,934,724
[45] Date of Patent: Aug. 10, 1999

[54] METHOD AND DEVICE FOR ACCURATELY SUPPORTING AND POSITIONING MECHANICAL PARTS

[76] Inventor: Christian Ferriere, 8, Rue des Castors - 30100, Ales, France

[21] Appl. No.: 08/817,374
[22] PCT Filed: Oct. 9, 1995
[86] PCT No.: PCT/FR95/01315
§ 371 Date: Apr. 14, 1997
§ 102(e) Date: Apr. 14, 1997
[87] PCT Pub. No.: WO96/11773
PCT Pub. Date: Apr. 25, 1996

[30] Foreign Application Priority Data

Oct. 14, 1994 [FR] France .................. 94 12565

[51] Int. Cl.[6] .................................................. B25J 15/00
[52] U.S. Cl. ............................................................ 294/98.1
[58] Field of Search .................. 294/63.2, 93, 98.1, 294/119.3, 902; 269/22; 279/2.08, 4.03; 403/5

[56] References Cited

U.S. PATENT DOCUMENTS

| | | | |
|---|---|---|---|
| 3,462,934 | 8/1969 | Schulz et al. | 294/98.1 X |
| 3,741,409 | 6/1973 | Painter | 294/98.1 X |
| 5,090,758 | 2/1992 | Lord | 294/98.1 |

FOREIGN PATENT DOCUMENTS

| | | | |
|---|---|---|---|
| 0474397 | 3/1992 | European Pat. Off. | |
| 7925828 | 5/1980 | France. | |
| 2568161 | 1/1986 | France. | |
| 1502951 | 1/1970 | Germany. | |
| 2328296 | 12/1973 | Germany. | |
| 288785 | 10/1983 | Germany. | |
| 234407 | 4/1986 | Germany | 294/98.1 |
| 3800696 | 7/1989 | Germany. | |
| 3909630 | 9/1990 | Germany. | |
| 3938150 | 5/1991 | Germany. | |
| 92281 | 4/1991 | Japan | 294/98.1 |

*Primary Examiner*—Johnny D. Cherry
*Attorney, Agent, or Firm*—Ladas & Parry

[57] ABSTRACT

A device for supporting and positioning a mechanical part (4) having at least one bore (5) or a shaft with a cylindrical cross-section, on a supporting base plate (6) having at least one opening (18). A spindle (1) made of expandable material has a sealed hollow inner cylindrical space (16) for receiving a pressurized fluid. The spindle has a cylindrical rod-shaped end (15) which projects through the opening (18) at a distance from the base plate (6). A base of the spindle (13) has a greater diameter than the rod-shaped end (15) and is supported on a shoulder (22) of the base plate (6) behind the opening (18).

11 Claims, 3 Drawing Sheets

METHOD AND DEVICE FOR ACCURATELY SUPPORTING AND POSITIONING MECHANICAL PARTS

FIELD OF THE INVENTION

The present invention has for its object a method and device for accurately supporting and positioning mechanical parts.

BACKGROUND

The technical sector of the invention is the production of tools for gripping parts comprising at least one bore or a cylindrical pin.

One of the principal applications of the invention is the dimensional inspection of parts of small dimensions and of complex shape, such as for example those entering in the manufacture of electric circuit breakers. These parts are in fact delivered in large quantities and in batches: in order to be able to inspect dimensioning, twenty or thirty parts in each batch are sampled and certain dimensional characteristics thereof are checked on a three-dimensional measuring machine.

This checking operation requires that the parts be localized with precision, viz. at less than 0.01 millimeters with respect to a referential system of the machine, but also that they be maintained to ensure reliable acquisition of the points of measurement. It is therefore necessary to ensure simultaneous localization and hold of several parts in order to effect the campaign of measurement without the intervention of the operator. The parts in question present complex shapes but all have a reference bore with a diameter of 2 to 5 millimeters.

Now, the various techniques of localization and hold of the parts have developed only little in industry, whether it be in the applications of machining, assembling or inspection. In parallel to these techniques, the use of the methods of standardized dimensioning has demonstrated the usefulness of simple reference surfaces to define a mechanical part dimensionally. At all stages of development of a product, from the study, then manufacture, inspection and up to assembly, the reference surfaces appear as fundamental in the quality thereof. Up to the present time, various gripping systems make it possible to localize and hold mechanical parts, but when the reference surfaces are of cylindrical type (pin or bore), these devices are complex (gripping pliers for solid pin) and expensive, or unsuitable (smooth guiding pin or one with grooves) when the part must also be held. Moreover, the devices for localization in a bore introduce a functional clearance which is often incompatible with the precision of positioning required.

Various specific equipment has been developed for different types of particular parts to be held and of which certain have formed the subject matter of Patent Applications: mention may be made for example of Patent DE 3938150 on a precise localization device for the machining or grinding of disc-shaped parts comprising one or more radial grooves with or without a central hole; the device comprises fingers for positioning in said grooves.

Patent DD 288785 is also known, which discloses an element for positioning and holding flat parts provided with openings and intended to be machined, said element having a cylindrical base form housed on one side in the opening in the part and on the other side in a hole in the frame and made of elastomer of sufficient rigidity, or Patent EP 0474397 which teaches a device for fixing parts on a base having a protusion, and a hole thanks to a rotational element insertable in this hole and an internal expanding mechanism blocking the device in the hole depending on the desired position of blocking of the part.

Numerous other Patents relating to various systems for centering and positioning parts may be mentioned, but it is noted in all these existing devices that the dimensions, the diversity and complexity of the parts make it necessary to produce special gripping tools generally constituted by pliers, metallic guides, screw-clamping devices, etc., which represents study and production costs incompatible with the basic cost of the part in question, especially when the latter forms part of batches manufactured in mass-production as in the application mentioned hereinabove. Whether it be in complex systems or in simple systems requiring in that case multiple points of abutment and anchoring on the part to be held, it is also ascertained that the functions of localization and of hold are not always performed perfectly and create problems of quality of the inspection.

In the particular domain of inspecting parts of small dimensions on three-dimensional measuring machines, numerous problems have, up to the present time, thus remained without a solution. In fact, the weak points of the existing devices are, generally, as follows:

they offer few possibilities of adaptation and flexibility, making it necessary to multiply the number of tools, viz. at least one per part;

their production costs are fairly high and their implementation time long;

it is very difficult to make all the dimensional inspections of a part on the same tool without changing the position of said part due to the difficulties of access to the point of measurement, especially when several anchoring points are necessary;

certain existing devices do not really respect the geometry of the part especially when the holding device requires considerable clamping efforts;

when a bore is taken as point of reference of the measurement, clearances are introduced, rendering said measurement unreliable due to the tolerances of the parts;

it is difficult and sometimes even impossible to industrialize such devices due to their specialization and complexity.

SUMMARY OF THE INVENTION

The problem raised is therefore to overcome the drawbacks and weak points set forth hereinabove by producing a holding and positioning device which allows the precise localization of at least one part comprising at least one bore or a cylindrical pin, such localization and hold then being effected, according to the invention, with respect thereto; to attain the objects of the invention, the device must thus ensure said hold in position with respect to a reference plane, whatever the shape and overhang of the weight of the part and must be adapted to variations in dimensions thereof, must be rapid to carry out, allow a direct and easy access to all the desired points of measurement, must respect the geometry of the part without deforming it and be simple to produce and industrialize without requiring any specific speciality, and must be of reasonable cost to allow in particular supports receiving several parts at the same time to be produced.

One solution to the problem raised is a method for holding and positioning at least one mechanical part comprising at least one bore or a shaft of cylindrical cross-section on a supporting base plate comprising at least one opening; according to the invention, there is disposed in said opening a spindle made of expandable material, having a sealed hollow inner cylindrical space, whose end in the form of a cylindrical rod adapted to cooperate with the bore or the shaft of the part, projects beyond said base plate through said opening and whose base of diameter greater than the rod is maintained by a shoulder fast with said support and located to the rear of said opening; said rod is fitted inside the bore or around the shaft of the part to be held; a pressurized fluid P is sent into said hollow inner space of said spindle; the finger of the spindle is thus deformed by radial expansion, the surface of said spindle comes into contact with the bore or the shaft of the part, cooperates uniformly therewith, and becomes fast therewith; a sufficient pressure P is maintained in said spindle and a rigid link is constituted, ensuring hold of said part on the support and positioning thereof with respect to said opening.

When said mechanical part to be held and gripped comprises at least one bore, said rod of the spindle is a hollow cylindrical finger closed at its end, and of which the thickness of the outer peripheral wall is thin in comparison with its diameter, its length and the thickness of the end; in that case, the device preferably also comprises a metallic outer cylindrical envelope surrounding said rod over the whole of its length, said envelope being radially expandable over at least a part of its height thanks to grooves disposed along certain generatrices and being fitted at one of its ends in said opening borne by the supporting base plate.

When said mechanical part to be held and positioned comprises at least one shaft of cylindrical cross-section, said rod of the spindle according to the invention is a hollow cylinder open at its end, forming a bore, and whose closed inner cylindrical space is disposed as a ring around this bore, the thickness of the inner peripheral membrane of said cylinder being thin; in that case, the device preferably comprises a rigid cylindrical mandrel disposed outside the rod over the whole of its length and fitting at one of its ends in said opening borne by the supporting base plate, and also an inner metallic envelope located in said bore of the rod and comprising slots disposed along certain generatrices over at least a part of the height of said bore.

This results in novel methods and devices for accurately holding and positioning mechanical parts, responding to the problem raised hereinabove and enabling the objects recalled hereinabove to be attained, knowing that each of said parts must comprise at least one bore or a cylindrical shaft from which said hold of the part in question and positioning thereof with respect to the supporting base plate are effected.

The principle of this device is based on the elastic deformation of a spindle under the effect of an isotropic pressure created by a viscous fluid under pressure.

The device according to the present invention responds well to the object of accurately positioning any parts each presenting a bore or a reference shaft to effect the dimensional inspection thereof, or for any intervention requiring a precise positioning, such as for automatic handlings, precision assembly operations, rapid cutting-tool changers, couplings of solid or hollow shafts, etc.

In fact, the development of the device according to the invention makes it possible to bring an economic response to numerous industrial applications, in addition to those mentioned in the introduction for dimensional inspection, such as among certain potential applications which may be envisaged in the immediate future:

for the users of three-dimensional measuring machines (called TMM): mono- or multi-spindle device for localization and hold of parts presenting a bore or reference shaft of diameter 2 mm; more than 90% of the mechanical parts enter in this category;

for the users of assembly or manufacturing robots: gripping and positioning device for replacing clamps of robots when the parts to be manipulated present a bore or a shaft (90% of the cases);

for aeronautic assemblings: development of independent expandable spindles for the localization and hold of the sheet metal coatings during the counter-boring operations of the structures.

Moreover, the methods and devices according to the invention present the following advantages:

localization by radial concentric expansion, either outside of the finger of the spindle, or inside by radial concentric narrowing of its bore, making it possible to localize a mechanical part with precision, also ensuring hold thereof;

conservation of the perpendicularity of the axis of the finger of the spindle or of its bore with respect to the reference plane formed by its support, during pressurization;

concentricity of the expandable part of the finger of the spindle or its bore with respect to its initial axis after pressurization;

creation of a couple for holding the parts to ensure a stable positioning thereof during the interventions of manufacture or of inspection by the combination of the coefficient of friction of the surface of the parts with those of the device, and of the contact pressure due to expansion;

compensation of the variations in diameter of the bore or the shaft of the parts within the limit of elastic deformation of the device;

tightness of the expandable walls of the spindle which may be of acetal, and reliability due to the use in the elastic domain of deformation; this spindle may be produced by machining: in this version, the metallic envelope is glued on the acetal; or by moulding, in which case the metallic envelope is introduced in the mould before the moulding operation, which ensures a perfect bond of the two materials;

geometry of the assembly ensured by the metallic envelope ensuring the part interface, which makes it possible to obtain high contact pressures with the part to be localized without local deformation (rigidity of the bond) and which, due to its tubular structure, makes it possible to take up the efforts of torsion induced by the outside forces acting on the part, while allowing a sufficient expansion to take into account the variations in diameter of the parts (tolerance on shafts and/or bores) thanks to the longitudinal slots or grooves or slits.

Other advantages of the present invention may be mentioned but those mentioned above already demonstrate sufficient to prove the novelty and interest thereof. The description and the following Figures show an embodiment of the invention but present no limiting character: other embodiments are possible within the scope and extent of this invention, in particular to adapt expandable spindle devices to various mechanical parts including any application where it is desired to ensure hold thereof, and where a hydraulic supply is available, with respect to a base plate which may receive one or more parts at the same time.

DETAILED DESCRIPTION

Said Figures therefore show an embodiment for holding and positioning a mechanical part 4 comprising at least one bore 5; but, in other embodiments, such as recalled hereinabove, the device according to the invention might be adapted to hold and position said part 4 comprising at least one shaft of cylindrical section.

Figure 1:
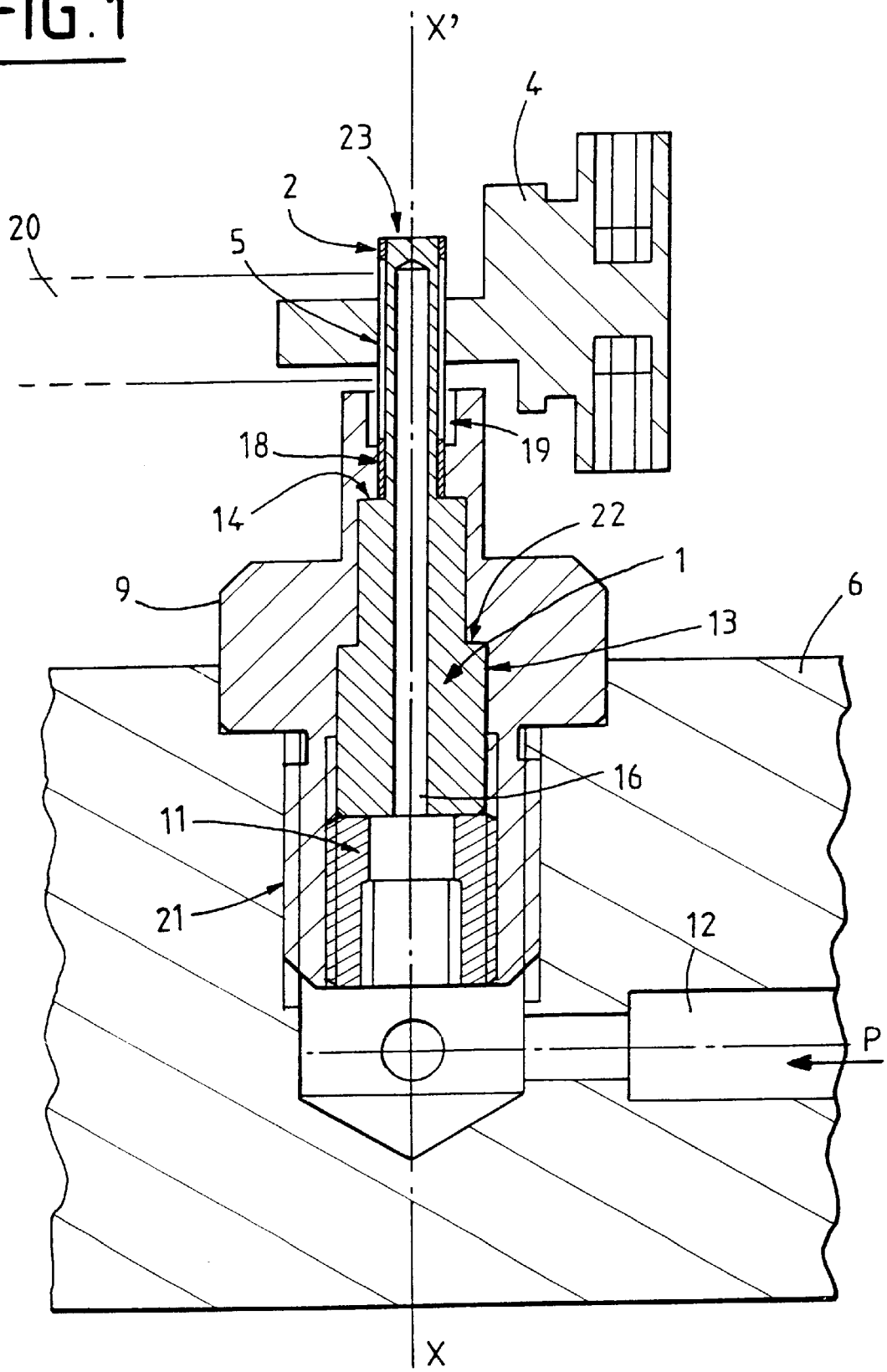
FIG. 1 is a view in section of an embodiment of the present invention for, in particular, a machine for three-dimensional measurement of a small mechanical part presenting at least one bore.
Figure 2:
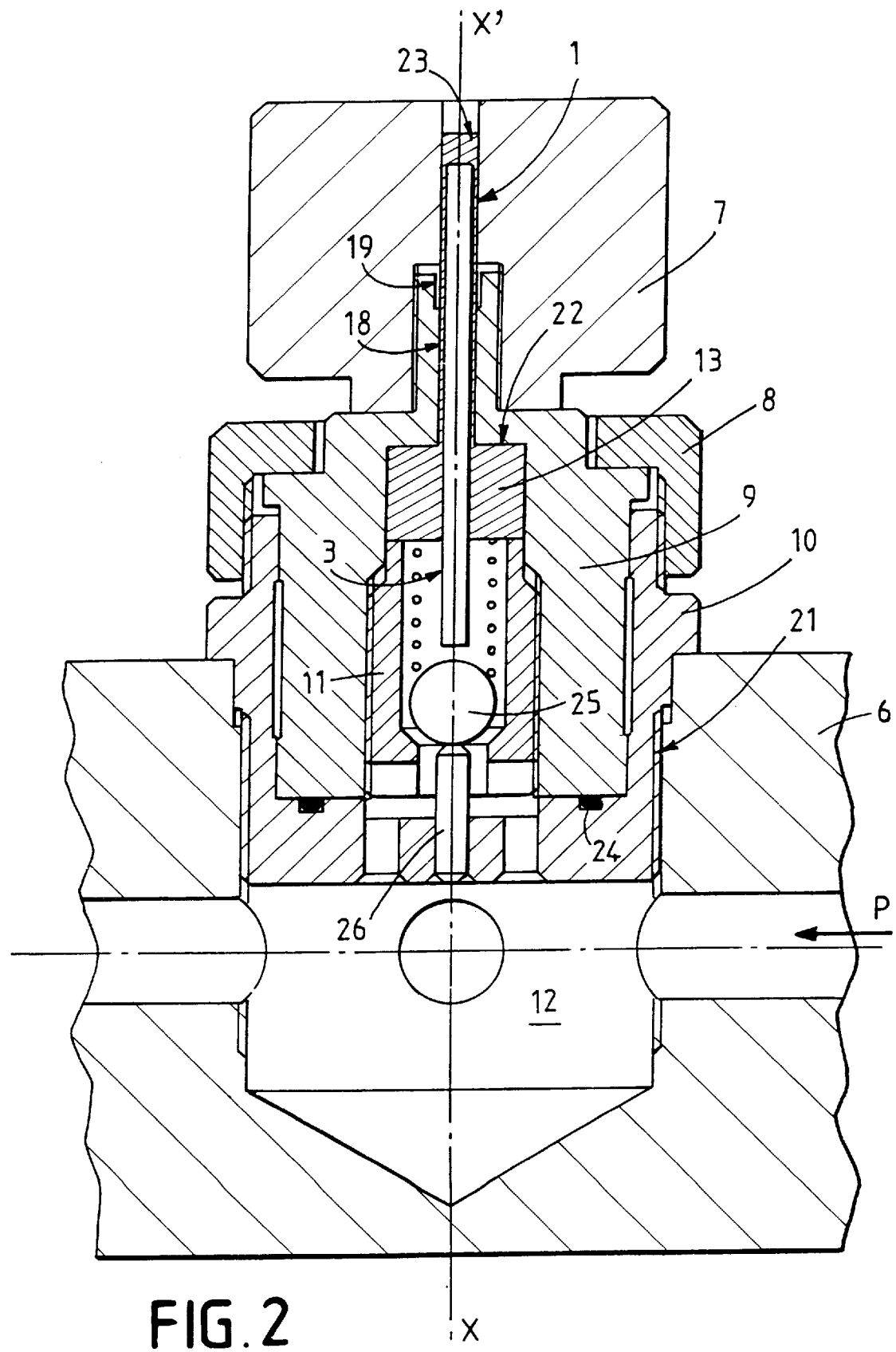
FIG. 2 is a view in section of a device equivalent to that of FIG. 1 but with a different form of embodiment allowing interchangeability and shown with a protecting cover.

In FIGS. 1 and 2, the device according to the invention is shown alone with one piece 4 but it might be duplicated in as many copies as necessary on the same supporting base plate 6, in order to receive for example batches of twenty or thirty parts which may be disposed simultaneously, and thus inspect the dimensions thereof at the same time on a three-dimensional measuring machine adapted to that end and of which the measuring means, not forming part of the subject matter of the invention, are not shown.

Said supporting base plate 6 therefore comprises at least one opening 18 and the device according to the invention comprises a spindle 1 made of expandable material, having a sealed hollow inner cylindrical space 16 which may receive a pressurized fluid P via supply circuit 12: the end of the spindle 1 in the form of rod 15 of cylindrical shape projects from said base plate 6 through said opening 18 and its base 13 of wider diameter than rod 15 is held by a shoulder 22 fast with said support 6 and located to the rear of said opening 18.

Figure 3A:
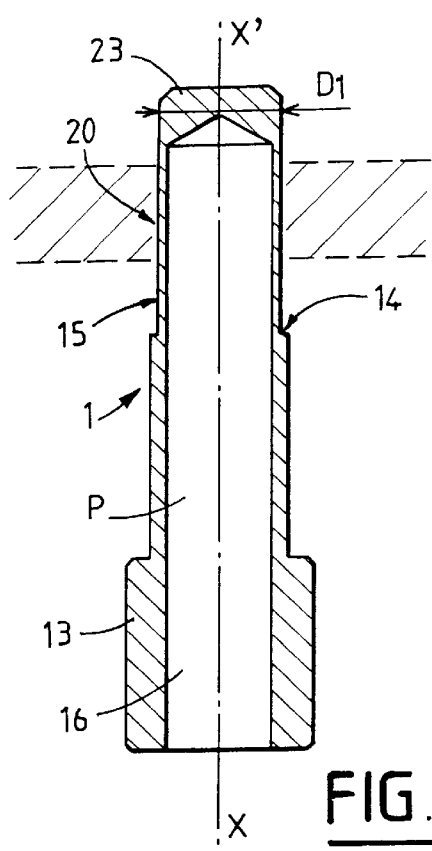
FIGS. 3a, 3B and 4a, 4B show views in section of different embodiments of expandable spindles in finger-form and one example of an outer metallic envelope.
Figure 3B:
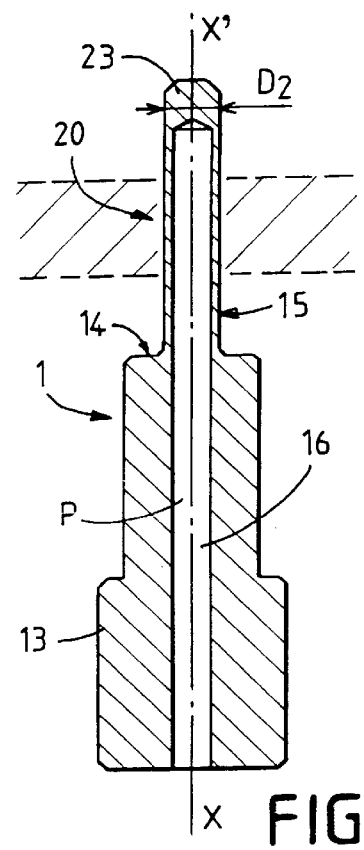
Figure 4A:
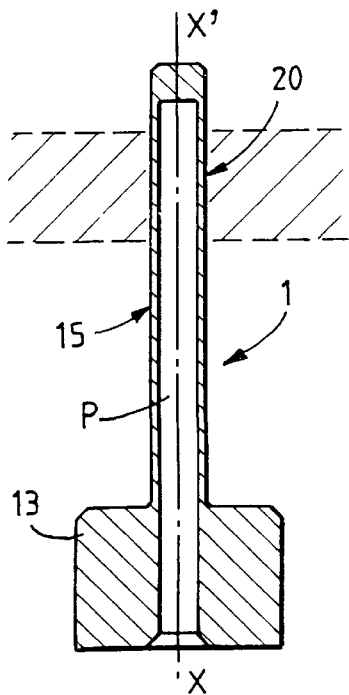

In accordance with one embodiment, when said part 4 comprises a bore 5, as shown in FIGS. 1 and 2, said rod 15 of the spindle 1 is a hollow cylindrical finger closed at its end 23, as shown in FIGS. 3A, 3B, and 4A, and of which the thickness of the outer peripheral wall is thin in comparison with its diameter, its length and the thickness of the end 23. The ratio of the thickness over the diameter must essentially respect the rules of calculation of the thin envelopes, of which the conditions are well known in material resistance for calculating the structures of this type responding to the conditions of the present invention.

The expandable spindle 1 of the device may be constituted by a single material selected from the family of thermoplastics such as methyl polymethacrylate (MPMA), polyoxymethylene (POM) or acetal, polyamides, although these materials are delicate to machine, polycarbonates . . . In fact, the material chosen must present mechanical characteristics respecting the following criteria: tensile strength included between 5 and 8 da N/mm$^2$; modulus of elasticity between 200 and 300 da N/mm$^2$; machinability and aptitude to be moulded. The characteristics and shape of the expandable spindle 1 represent, from the theoretical standpoint, the best compromise between, on the one hand, the capacity of expanding under the effect of an internal pressure P and, on the other hand, the possibility of ensuring mechanical interfacing between the part 4 and the reference support 6; the minimum diameter from which this solution of monolithic spindle as shown in FIGS. 3A and 3B can be produced, is established at 4 millimeters. However, and taking into account the families of parts which may be concerned by the device according to the invention and the advantage procured thereby, a composite spindle may be used, making it possible to cover the range of diameter below 4 millimeters down to 2 millimeters as described hereinafter and specifically shown in FIGS. 4A and 4B and in position in FIGS. 1 and 2.

Whatever the embodiment of said spindle 1, the thickness of the peripheral wall of expandable material, in the useful zone 20 of its deformable part 15, in the form of a finger or rod, must be perfectly mastered to allow a perfectly symmetrical homogeneous expansion about its axis XX': this must in fact allow a uniform contact in the bore 5 of the part 4 to be held and positioned thanks to an internal pressure P transmitted in the inner part of the hollow space 16 and which may be very high, of the order of several hundreds of bars.

According to FIG. 4A and its representation in position in FIG. 2, said expandable spindle may comprise one single shoulder between the rod or the finger 15 and the base 13, which abuts against the shoulder 22 of the spindle supporting barrel 9, the lower part of the finger 15 traversing the bore opening 18 to open out thereabove over a height making it possible to traverse at least the length of the bore 5 of the part 4 to be held; in another embodiment, as shown in FIGS. 3A, 3B and in position in FIG. 1, said spindle 1 comprises a second shoulder 14 located between its base 13 and the rod 15, in order to reduce the length of the thin peripheral wall of finger 15, taking into account the useful zone 20 of deformation by radial, homogeneous and uniform expansion having to receive the bore 5 of the part 4.

Figure 4B:
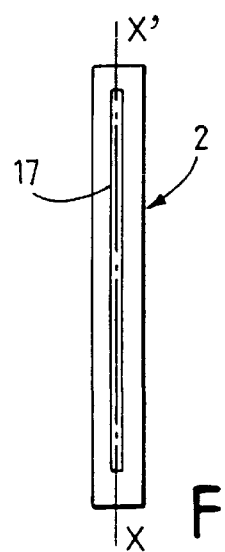

In a preferred embodiment, as shown in FIGS. 4A and 4B but this may be adapted in the embodiment of FIGS. 3A and 3B, the spindle is constituted by a plurality of elements such as, on the one hand and preferably, a metallic outer cylindrical envelope 2 surrounding the rod 15 over the whole of its length, said envelope 2 being radially expandable over a part of its height thanks to grooves, slits or slots 17 disposed at peripherally regular intervals along certain generatrices and fitting at one of its ends which is the lower one in said opening 18; this outer metallic envelope may comprise for example four slots 17 disposed at 90° and at least covering the length of the useful zone 20 and even beyond, so as to guarantee a symmetrical and homogeneous expansion over the height of the bore 5 which must be positioned in this useful zone. This deformable metallic envelope 2 essentially allows take-up of the bending forces which are very considerable when the part 4 comprises a lever arm greater for example than five times the reference diameter of its bore, also furnishes a coefficient of friction more favorable for maintaining said part in rotation, and finally mechanically protects the walls of the undeformable expandable part of the spindle; furthermore, this expandable part ensures tightness with the support parts of the base plate and the transmission of pressure P.

Moreover, according to another preferred embodiment, said composite spindle may also comprise, as shown in FIG. 2, an inner metallic core 3, or mandrel or stiffener, likewise having openings or slots but, here, in order to allow passage of the fluid under pressure and not for its radial deformation; said mandrel or core 3 being cylindrical and rigid is located in the inner space 16 of the spindle 1 and disposed at least over the whole height thereof, passing through and over the whole height of said opening 18 in which it allows fit of the rod 15 of the spindle and even as far as projecting from the lower part of the base 13, which makes it possible to take up the bending and shear forces in addition to and in complement of the metallic outer envelope 2 described hereinbefore.

Thus, in the complete embodiment of the structure of the spindle in its composite form with an inner metallic core 3, its expandable walls which may be acetal 1 and the outer metallic envelope ensuring the interface with the part 4 to be supported and which may be made of copper with treated berylium, the various qualities of each of the components are associated, namely: the rigidity of the core or of the inner metallic mandrel 3 for taking up the bending or shear forces transmitted by the part 4 during the operations of measurement or other applications producing external forces; the tightness of the expandable walls and the reliability due to the use in the elastic domain of deformation; the maintenance of the geometry of the assembly ensured by the outer envelope 2 which makes it possible to obtain strong contact pressures with the part 4 and to localize it without local deformation thanks to the rigidity of the bond, and which, due to its tubular structure, makes it possible to take up the torsional forces induced by the external forces acting on the part, while allowing an expansion sufficient to take into account the variations in diameter of the bore 5 of the part 4 due to the tolerances for the bores, thanks to the longitudinal slots 17.

According to the representation of FIGS. 1 and 2 of said spindle 1 in position of assembly, the device according to the invention comprises a part 9 referred to as a "barrel", in which said opening 18, through which said rod 15 of the spindle 1 passes, is made; which barrel 9 is fixed on said supporting base plate 6 and bears on the side opposite said opening 18 a shim 11 for holding the base 13 of the spindle 1 immobilized in a corresponding bore in the part 9; the latter is itself fixed, preferably by screwing, and must be sealed, in a hole 21 in the base plate 6, in the lower part of which the hydraulic supply 12 of a viscous fluid at pressure P opens out: this pressure is transmitted to the entire inner space 16 of the spindle 1 via openings made in the different connecting and fixing parts.

The outer upper part of the opening 18 through which the rod of said expandable spindle 1 passes, may comprise a part having an inner diameter greater than that of the bore 18 proper: this forms an outer shoulder 19 to allow the lower part of the deformable rod 15 to begin to deform radially and then be perfectly cylindrical and symmetrical in the useful zone 20 which may then be just above this outer part 19 at the place where the part 4 must be positioned, then coming into abutment thereagainst.

According to FIG. 2, in order to develop a multi-purpose device, in particular for users of three-dimensional measuring machines, which use supply plates 6 making it possible to receive spindles 1 of various diameters such as those shown in FIGS. 3A and 3B, respectively of different diameters D1 and D2, the fixed support thereof may allow a rapid change of these spindles. To that end, the localization system according to the invention is constituted by:

- a barrel-holder 10 screwed in the base plate 6 which ensures fluid supply 12 of spindle 1 and which is itself supplied by a device (not shown) for placing it under pressure P: this may either be manual with two steps, with a low pressure for localization and orientation of the parts without clearance and at controlled high pressure for holding the parts 4; or with automatic pressurization to ensure a more comfortable use of the device, this system being able to be constituted by a motorized hydraulic pump and a fluid distribution with two pre-adjusted levels of pressure.
- a spindle barrel 9 which is introduced in the barrel holder 10 and which is maintained in position by a knurled nut 8. Tightness of the connection is ensured by an O-ring 24 located in the barrel holder and housed in a groove. A flat bearing between the opposite surfaces of the barrel and the barrel holder ensures a dynamic pressure loss to limit the pressure applied on the seal. The spindle barrel presents a non-return valve 25 constituted by a metal ball and a pre-stressed spring which applies the ball on its seat when the barrel 9 is removed from its support 10 for replacement. A fixed mechanical pin 26 in the barrel holder 10 ensures rise of the ball to ensure the passage of the fluid. The valve described hereinabove has for its object to avoid losses of fluid during manipulation of the interchangeable spindles 1 and also to avoid air bubbles in the spindle 1.
- a cap for protecting each of these spindles during their manipulation, constituted by a knurled part 7 which is screwed on the spindle holder barrel 9 and whose inner diameter constitutes a sliding adjustment with the outer diameter of the expandable spindle 1 for a zero pressure. Such adjustment avoids the risks of bursting and fatigue of the spindles on a multi-spindle device when they are not used and are in the free state during pressurization; it also makes it possible to test the tightness of the device at high pressure without any risk for the spindles. Finally, it ensures mechanical protection thereof during manipulation of the device or during storage thereof.

The pressure P of use of the device may be greater than the bursting pressure of the spindles in the free state due to the presence in particular of the outer metallic parts 2 which limit the expansion of the spindles 1. This characteristic of the product makes it possible in particular to increase as desired the contact pressure of the spindles 1 with the parts 4 when the forces applied on these parts risk driving them in rotation.

What is claimed is:

1. A method for holding and positioning at least one mechanical part relative to a supporting base plate provided with at least one opening, said method comprising:

supporting one end of a spindle within said at least one opening in said base plate, engaging an opposite end of said spindle with said at least one mechanical part to be held and positioned with respect to the base plate, providing said opposite end of said spindle with properties to enable said opposite end of said spindle to undergo radial expansion while being provided with a tensile strength of between 5 and 8 da N/mm$^2$, a modulus of elasticity of between 200 and 300 da N/mm$^2$, and capability of being machined and molded, providing a hollow space within said spindle connectible to a pressure fluid to radially expand said opposite end of said spindle to hold and secure said at least one mechanical part, providing said spindle with an enlarged base having a shoulder engaged with said supporting base plate so that the spindle is securely engaged with the base plate when said opposite end of the spindle is radially expanded to hold and secure said at least one mechanical part, and forming said spindle with two coaxially engaging parts, a first part being a hollow tube providing said hollow space to receive said fluid under pressure, and a second part forming said opposite end of said spindle which engages said at least one mechanical part to hold and position said at least one mechanical part when pressure fluid is introduced into said hollow space, and providing one of said parts with a plurality of longitudinal slits in spaced relation therearound along a portion of the height of said one part.

2. The method as claimed in claim 1, comprising positioning said one part which is provided with the longitudinal slits on the outside of the other of said parts such that said one part forms said end of the spindle which engages the said at least one mechanical part, said one part being radially deformable due to said longitudinal slits therein.

3. The method as claimed in claim 1, comprising positioning said one part which is provided with the longitudinal slits within the other of said parts, said one part being provided with said hollow space to receive said fluid under pressure and to deliver said fluid to the other of said parts through said slits to cause said other of the parts to expand radially to hold and position said at least one mechanical part.

4. A device for holding and positioning at least one mechanical part relative to a base plate, said device comprises a spindle having a sealed hollow inner cylindrical space for receiving a fluid under pressure, said spindle having an end in the form of a rod of cylindrical shape which projects from said base plate to engage said at least one mechanical part, said rod being made of expandable material, and including a widened base forming a shoulder spaced from said end of the rod to engage said base plate and be secure therewith, a metallic cylindrical envelope having opposite ends and a determined height, said cylindrical envelope having longitudinal grooves therein spaced therearound over at least a part of its height to provide radial expandability for said envelope, said envelope being fitted at one of said ends in said opening, said expandable material of said rod having a tensile strength between 5 and 8 da N/mm$^2$, a modulus of elasticity between 200 and 300 da N/mm$^2$ and being capable of being machined and molded.

5. Holding and positioning device according to claim 4, which is engageable in a bore in said at least one mechanical part wherein said rod comprises a hollow cylindrical finger closed at one end, said finger having an outer peripheral wall having a thickness which is thin in comparison with diameter length and thickness of said closed end.

6. Holding and positioning device according to claim 5, wherein the metallic cylindrical envelope is outside and surrounds the rod over the entire length of said envelope.

7. Holding and positioning device according to claim 5, and comprising a rigid cylindrical mandrel located in the spindle.

8. Device according to claim 4, comprising a rigid cylindrical mandrel disposed for engaging in an opening in said at least one mechanical part.

9. Device according to claim 4, wherein said metallic envelope is located in said rod.

10. Holding and positioning device according to claim 4, said spindle comprising a second shoulder located between its base and said rod.

11. Holding and positioning device according to claim 4, and comprising a barrel provided with said opening through which said rod passes, said barrel being fixed on said base plate , a shim between said barrel and said base plate for engaging and immobilizing said base of the spindle.

* * * * *